United States Patent

Murata et al.

[11] Patent Number: 5,347,415
[45] Date of Patent: Sep. 13, 1994

[54] HEAD HEIGHT ADJUSTMENT METHOD INCLUDING A SYNCHRONIZED ROTATING LASER BEAM OPTICAL AXIS

[75] Inventors: Akio Murata, Takatsuki; Takaaki Maegawa, Neyagawa; Hideaki Mukae, Sanda; Masaru Higashionji, Katano, all of Japan

[73] Assignee: Matsushita Electric Industrial Co., Ltd., Oska, Japan

[21] Appl. No.: 44,775

[22] Filed: Apr. 12, 1993

[30] Foreign Application Priority Data

Apr. 15, 1992 [JP] Japan .................. 4-095069

[51] Int. Cl.⁵ .................. G11B 5/58; G11B 21/24
[52] U.S. Cl. .................. 360/109; 360/77.12
[58] Field of Search .................. 360/109, 107, 108, 84, 360/77.01, 77.12, 77.13, 77.16, 75; 359/401, 503, 861; 369/44.18, 97

[56] References Cited

U.S. PATENT DOCUMENTS

| 4,186,480 | 2/1980 | Binder Kriegelstein et al. | 360/84 |
| 5,065,267 | 11/1991 | Yohda | 360/109 |

FOREIGN PATENT DOCUMENTS

| 61-189463 | 11/1986 | Japan . |
| 62-93028 | 4/1987 | Japan . |
| 62-134118 | 6/1987 | Japan . |
| 1-227279 | 9/1989 | Japan . |
| 4-252414 | 9/1992 | Japan . |
| 4-310613 | 11/1992 | Japan . |
| 4-310617 | 11/1992 | Japan . |
| 4-318315 | 11/1992 | Japan . |
| 5-020652 | 1/1993 | Japan . |

Primary Examiner—Stuart S. Levy
Assistant Examiner—Craig A. Renner
Attorney, Agent, or Firm—Wenderoth, Lind & Ponack

[57] ABSTRACT

In a magnetic recording and/or reproducing apparatus, it is necessary to adjust the height of each of a plurality of magnetic heads carried by a rotary cylinder for movement together therewith. This adjustment is accomplished by rotating an optical axis of a laser beam emitted from a laser oscillator in synchronism with the rotary cylinder so that the optical axis is always maintained stationary relative to the magnetic head. The laser beam is subsequently irradiated to a head base in the proximity of a head chip secured to the head base, thereby adjusting the head height during rotation of the rotary cylinder.

2 Claims, 3 Drawing Sheets

HEAD HEIGHT ADJUSTMENT METHOD INCLUDING A SYNCHRONIZED ROTATING LASER BEAM OPTICAL AXIS

BACKGROUND OF THE INVENTION

1. Field of the Invention

The present invention relates generally to a method of adjusting the position of a plurality of magnetic heads mounted in a magnetic recording and/or reproducing apparatus which records or reproduces information to or from a recording medium in the form of a tape, and more particularly to a method of adjusting the height of each of the magnetic heads securely mounted on a rotary cylinder, which rotates inside the apparatus during recording or reproduction.

2. Description of the Prior Art

The accuracy required for properly positioning the magnetic heads in the magnetic recording and/or reproducing apparatus is an important factor to determine a track pattern to be recorded on the recording medium.

For example, in home video cassette recorders which are in wide practical use today, two pairs of magnetic heads are secured to a rotary cylinder substantially symmetrically on opposite sides thereof with respect to the center of rotation. The two magnetic heads successively obliquely scan a magnetic tape during recording or reproduction of information such as, for example, video or audio signal information. The pitch of tracks to be actually recorded on the magnetic tape is generally very small, i.e. about 60 $\mu$m for a two-hour mode and of about 20 $\mu$m for a six-hour mode.

If the two pairs of magnetic heads cannot scan these tracks with accuracy, it is impossible to accurately reproduce the recorded information, resulting in a considerable reduction in quality of reproduced images. To prevent such reduction, the scanning pitch of the magnetic heads is required to be in good agreement with the track pitch. One of important factors required to determine the scanning pitch is the height of the magnetic heads.

As shown in FIG. 1, the head height includes an absolute height Ha and a relative height Hr. The absolute height Ha is the distance between a reference plane 35 of a lower cylinder 31 and an lower end of a gap of a head chip 30 securely mounted on an upper cylinder 32 via a head base 33.

A conventional head height adjustment method is hereinafter discussed with reference to FIG. 1.

Initially, rough adjustments are carried out after a spacer 39 having a predetermined thickness has been inserted between the upper cylinder 32 and the head base 33 to which the head chip 30 has been bonded. Then, while the head height is being observed using a CCD camera 36 and a monitor 37, an adjusting vise or minute screw 40 in abutment with a portion of the head base 33 is screwed down by a required amount in a direction shown by an arrow 110, thereby causing partial deformation of the head base 33 and adjusting the head height to an intended height.

The principle of the conventional adjustment method with the use of the minute screw 40 is to utilize the deformation of the head base caused by the biasing force of the adjusting screw within the elastic limit thereof. In this case, if the extent to which the screw is threaded varies due to mechanical vibrations or temperature changes, the extent to which the head base 33 is deformed varies in proportion thereto, resulting in a change in head height.

Actual VTRs include factors such as, for example, cylinder rotation, tape travelling, and the like, which may cause vibrations, and temperature changes are not avoidable which are generally caused by changes with time in the amount of heat produced by various vibration sources or changes in environmental circumstances.

At present, an inhibitor (resin which sets at room temperatures) for preventing screw loosening is generally used to minimize the influence from these variation factors. The effect of this inhibitor is not sufficient to completely prevent the screw loosening, and the head height has hitherto occasionally changed in units of several microns.

In applications where a hydraulic bearing is utilized as a bearing for the rotary cylinder, the position of the rotatably arranged upper cylinder relative to the stationary lower cylinder greatly varies according to whether a rotary shaft 100 of the upper cylinder is rotating. Accordingly, in the conventional method wherein the head height is adjusted under a static state, it is difficult to maintain the accuracy of the head height during cylinder rotation. Eventually, adjustment efforts have no choice but to generally depend upon trial and error.

In order to overcome the problems inherent in the head height adjustment by the use of the minute adjusting screw, Japanese laid-open patent publication No. 4-310613 discloses a head height adjustment method wherein partial plastic deformation is caused by irradiating a laser beam to a head base carrying magnetic heads. According to this publication, the adjustable speed of the cylinder depends upon the accuracy of irradiation timing at which the laser beam is irradiated or the laser energy required to cause the deformation. Because of this, adjustments cannot always be carried out at a rated speed (the number of rotation of the cylinder at the time actual recording or reproduction is carried out).

SUMMARY OF THE INVENTION

The present invention has been developed to overcome the above-described disadvantages.

It is accordingly an object of the present invention to provide an improved head height adjustment method capable of effectively adjusting the height of a magnetic head accommodated in a rotary cylinder with accuracy under the conditions in which the rotary cylinder is being rotated at a rated speed. The head height appropriately adjusted by the method according to the present invention is not affected by vibrations or temperature changes.

In accomplishing the above and other objects, according to the present invention, an optical axis of a laser beam is initially rotated in synchronism with the rotary cylinder so that the optical axis may be always maintained stationary relative to the magnetic head. The laser beam is then irradiated to a portion of a head base in the proximity of a head chip secured to the head base, thereby adjusting the head height during rotation of the rotary cylinder.

The head height adjustment method according to the present invention is a method in which welding deformation caused by irradiating a laser beam to a plate material is utilized. When a pulsed laser beam is irradiated to the head base, the portion irradiated is rapidly heated up to a relatively high temperature, and hence, thermally expands whereas the remaining portion not irradiated is maintained at a relatively low temperature. As a result, the head base is deformed or curved with the irradiated surface being convexed. At this moment, the yield stress of the high-temperature portion is reduced and the high-temperature portion is partially subjected to plastic deformation under restriction by the relatively-low-temperature portion encircling the high-temperature portion. Thereafter, although the high-temperature portion is cooled and contracts due to heat conduction towards the low-temperature portion, the head base is restored to an original flat shape and is deformed or curved again with the irradiated surface being concaved, depending upon the amount of plastic deformation caused during the thermal expansion process.

According to the present invention, because the laser beam is irradiated to the head base at a location between a proximal end thereof secured to the rotary cylinder and a distal end thereof to which the head chip is secured, the deformation of the head base is followed by a height change of the head chip. Accordingly, the height of the head chip can be appropriately adjusted by controlling the amount of deformation of the head base after the cooling.

According to the present invention, because the head height is adjusted by plastic deformation caused by the irradiation of the laser beam, the adjusted head height is unlikely to be affected by mechanical vibrations or temperature changes. Furthermore, because the deformation of the head base is caused under a non-contact condition, the head height adjustment can be carried out while the rotary cylinder is being rotated.

In addition, because the optical axis of the laser beam is rotated in synchronism with the cylinder rotation, the laser beam is maintained always stationary relative to the head secured to the cylinder even if the cylinder is being rotated. Accordingly, not only the position to be irradiated can be controlled with accuracy, but also the laser beam can be irradiated to a target spot or point without causing a trace of the irradiated laser beam to run on the head base irrespective of the time period for irradiation. As a result, highly accurate head height adjustment can be carried out.

BRIEF DESCRIPTION OF THE DRAWINGS

The above and other objects and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENTS

Figure 2:
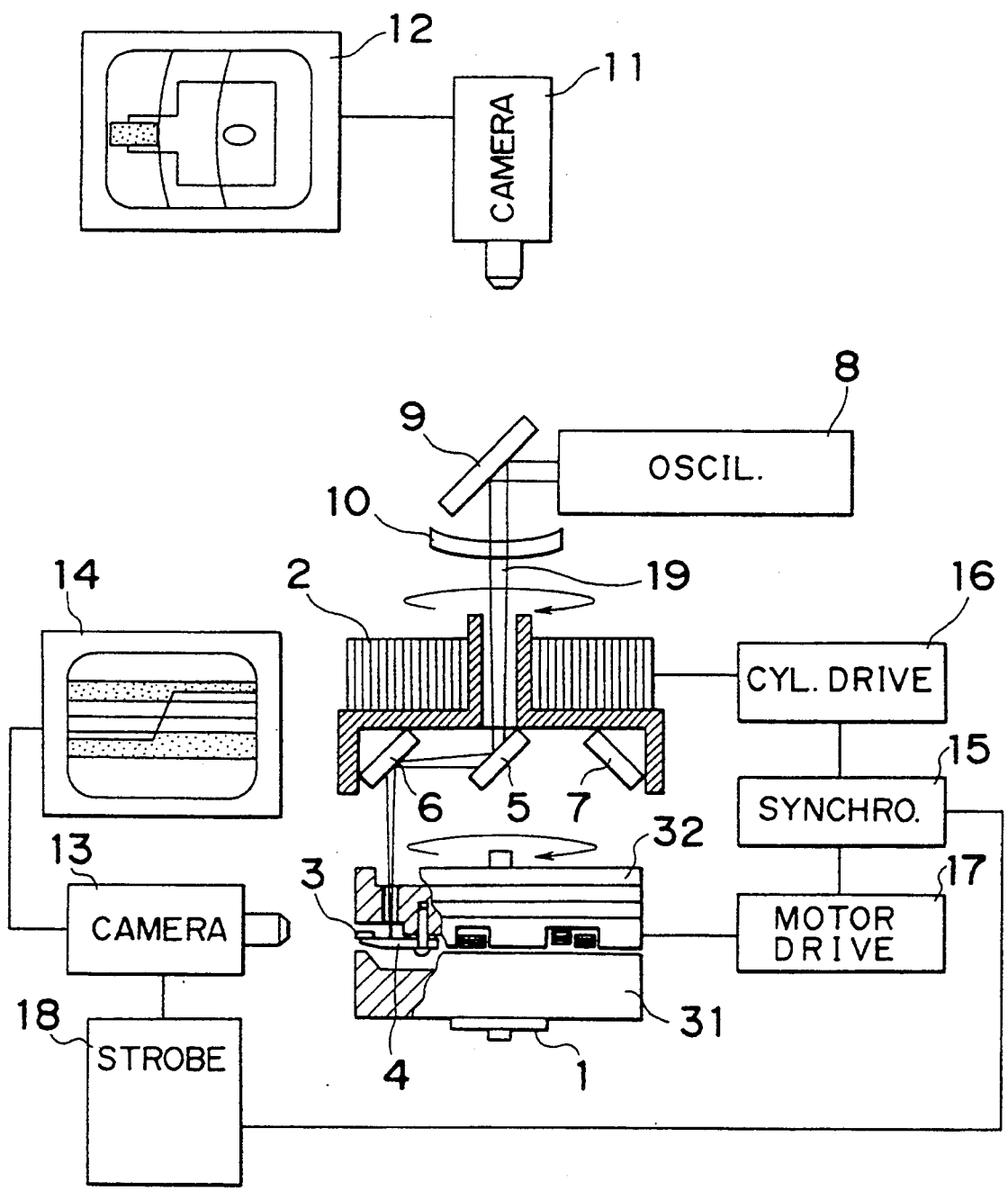
FIG. 2 is a schematic view of a head height adjusting device employing a method according to the present invention.

Referring now to the drawings, there is schematically shown in FIG. 2 a head height adjusting device employing a method according to the present invention. As shown in FIG. 2, a cylinder unit 1 comprises a stationary lower cylinder 31, an upper cylinder 32 opposed to the lower cylinder 31 and secured to a rotary shaft so as to be rotatable via a hydraulic bearing, a head base 4 made of brass secured to the upper cylinder 32 and having a thickness of 1.5 mm, and a head chip 3 secured to the head base 4.

A hollow motor 2 is disposed above the cylinder unit 1 and has a rotary shaft in alignment with that of the cylinder unit 1. Three mirrors 5, 6, and 7 are securely mounted on a rotary segment of the hollow motor 2. Two (5 and 6) of them are provided for reflecting a laser beam 19 passing through a hollow shaft of the hollow motor 2, whereas the other one 7 is a dummy mirror required for adjustment of the weight balance of the hollow motor 2. The dummy mirror 7 is, therefore, disposed on the side opposite to the mirror 6 with respect to the mirror 5 so that the center of gravity of the hollow motor 2 may not be off-centered during rotation.

The laser beam 19 is set into oscillation by a laser oscillator 8 and is reflected by a mirror 9 to advance towards the center of the rotary shaft of the hollow motor 2. The laser beam 19 is then focused on the head base 4 by a focusing lens 10.

Figure 4:
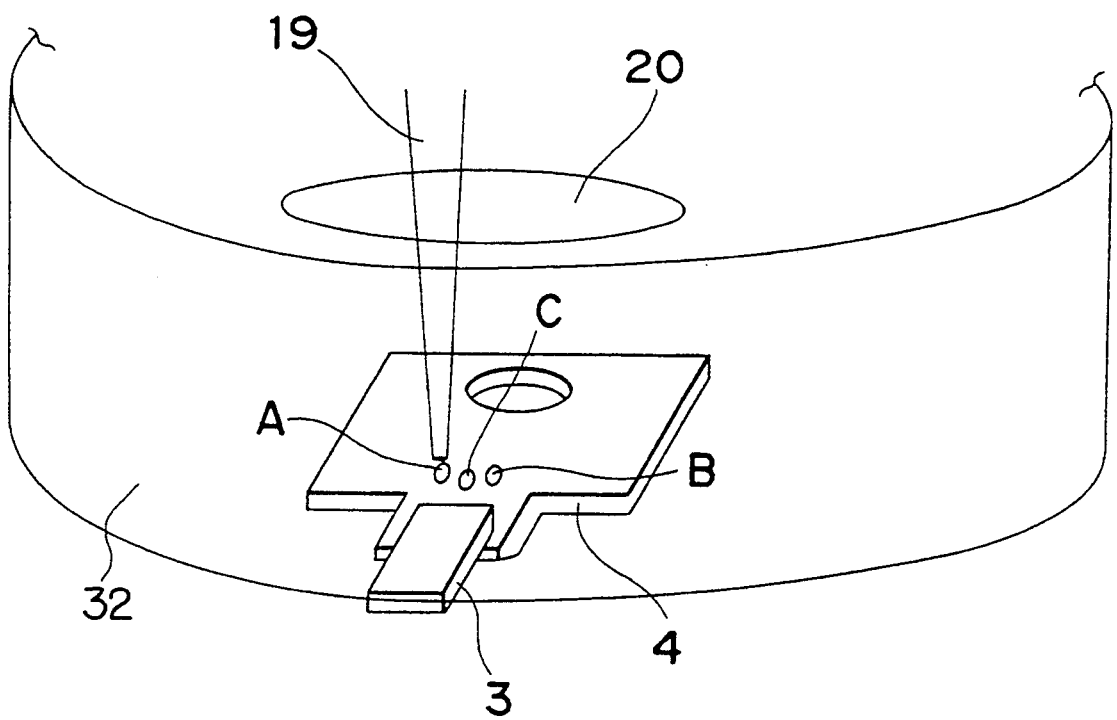
FIG. 4 is a perspective view, on an enlarged scale, of an upper cylinder accommodating the head base to which the laser beam is irradiated.

As best shown in FIG. 4, the upper cylinder 32 has an elliptical through-hole 20 defined therein and having a long axis oriented circumferentially thereof. The oscillated laser beam 19 passes through this through-hole 20 and is irradiated to the head base 4.

Returning back to FIG. 2, the position to be irradiated is observed by a CCD camera 11 and a monitor 12, both of which constitute part of an optical system for the laser beam 19. On the other hand, a gap surface of a magnetic head to be adjusted or measured is observed by a CCD camera 13 and a monitor 14 in the same manner. It is, however, to be noted that the CCD camera 11 and the monitor 12 are not necessarily required because the position to be irradiated is not always observed.

The hollow motor 2 and the upper cylinder 32 are rotated at 1800 rpm in synchronism with each other in order to maintain the laser beam 19 stationary relative to the magnetic head. Because the phase of rotation of the hollow motor 2 and that of the upper cylinder 32 can be freely changed, the head to be irradiated with the laser beam 19 can be selected or the position of the head base 4 to which the laser beam 19 is desired to be irradiated can be changed by controlling the phase deviation.

More specifically, a synchronization circuit 15 includes a reference signal generator and a delay circuit. A reference signal having a frequency of 30 Hz, which is generated by the synchronization circuit 15 to control the speed of rotation, is sent to a cylinder driving circuit 16 so that the upper cylinder 32 may be rotated at a constant speed of 1800 rpm. On the other hand, a delay signal, which is delayed a predetermined time period from the reference signal by the delay circuit, is sent to a motor driving circuit 17 so that the hollow motor 2 may be rotated at a constant speed of 1800 rpm at a phase different from that of the upper cylinder 32. The amount of deviation between the hollow motor 2 and the upper cylinder 32 can be controlled by changing the amount of delay, thereby changing the position of irradiation or selecting the head to be irradiated.

The synchronization circuit 15 is connected to a strobe light source 18 and sends thereto a synchronizing signal at a different phase in the same manner as above, thereby firing the strobe light source 18 just at the moment the head desired to be observed passes in front of the CCD camera 13. An image of the head gap surface thus obtained is reproduced as a stationary image on the monitor 14 by the CCD camera 13, and the relative height of all the heads mounted on the cylinder unit 1 is measured.

A specific adjustment method is discussed hereinafter. The relative height of all the heads mounted on the cylinder unit 1 was initially measured by the gap surface observation using the CCD camera 13, and the amount of adjustment required for setting the heads to respective predetermined heights was obtained. In this embodiment, the adjustment for the head 3 for which the required amount of adjustment was 12.3 $\mu$m is discussed in detail.

A pulsed laser beam emitted from an Nd-YAG laser having a wavelength of 1.06 $\mu$m was used as the laser beam 19. In order to adjust the head height, the pulse width of exciting flush light was rendered to be 5 msec, and the laser beam was irradiated by controlling the exciting voltage.

Figure 1:
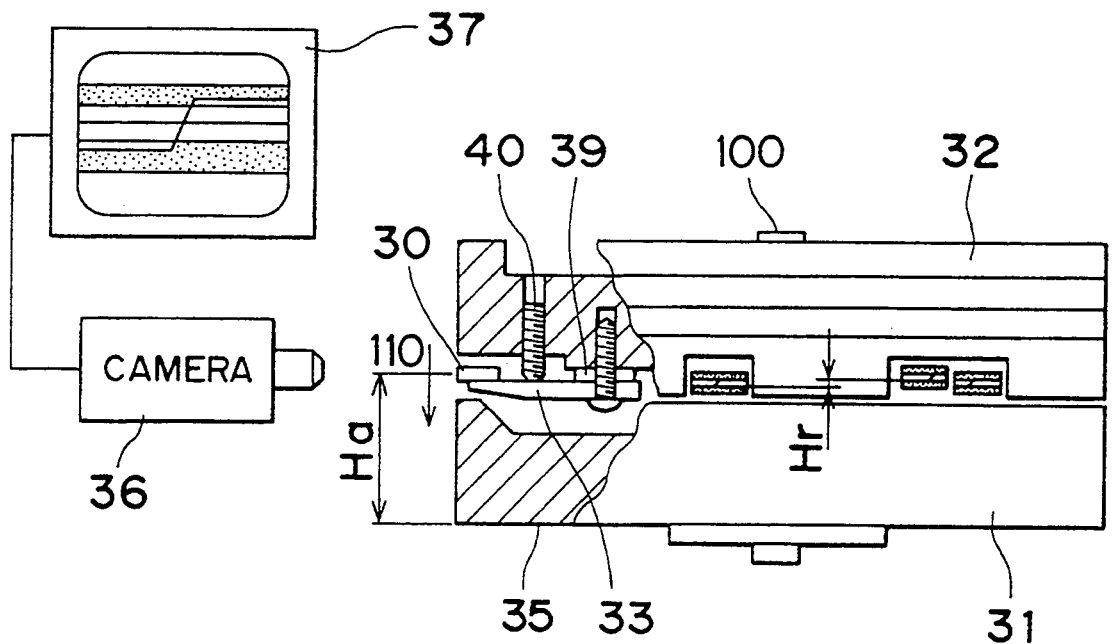
FIG. 1 is a schematic view explanatory of a conventional head height adjustment method.
Figure 3:
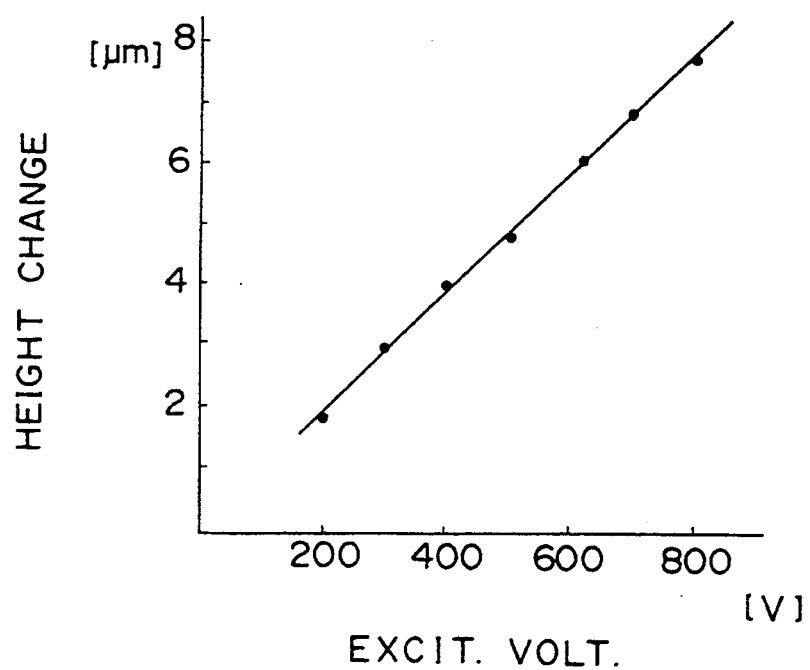
FIG. 3 is a graph indicating a relationship between the voltage applied to a laser oscillating lamp and the amount of change in head height caused by deformation of a head base at the time the laser beam is irradiated to the head base only once.

FIG. 3 depicts the result of experiments carried out with respect to a dummy head base and indicates the dependency of the amount of change of the head height upon the exciting voltage. In FIG. 3, the axis of ordinate indicates the amount of change in head height caused by a single shot of irradiation.

It can be known from the result shown in FIG. 3 that the single shot of irradiation is not sufficient for changing the height of the head 3 by 12.3 $\mu$m. The deformation of the head base, i.e. the head height adjustment by the laser beam irradiation is based upon the angular change by welding deformation at the position to which the laser beam is irradiated. The amount of change caused by the welding deformation is accumulative. From this fact, in this embodiment, irradiation was carried out plural times while the position of irradiation was being changed so that the total amount of change might become 12.3 $\mu$m.

More specifically, the laser beam 19 was irradiated to a position A shown in FIG. 4 at 730 V, which was expected to cause a 7 $\mu$m-change, as is known from FIG. 3. As a result of height measurement carried out almost simultaneously with the irradiation, it was confirmed that a height change of 6.5 $\mu$m was caused. Accordingly, the remaining amount of adjustment required was 5.8 $\mu$m.

Thereafter, the position to be irradiated was shifted 1.2 mm to a position B in a direction of rotation of the upper cylinder 32. Because the position to be irradiated was spaced 25 mm radially outwardly from the center of the cylinder unit 1, the 1.2 mm-shift required a delay of the rotation synchronizing signal to be given to the hollow motor 2 by about 255 $\mu$sec relative to the synchronizing signal to be given to the cylinder unit 1.

The irradiation at the position B was carried out at an exciting voltage of 310 V, which was expected to cause a 3 $\mu$m height change, as can be known from FIG. 3. In the same manner as above, as a result of height measurement carried out almost simultaneously with the irradiation, it was confirmed that a height change of 3.2 $\mu$m was caused. Accordingly, the remaining amount of adjustment required was 2.6 $\mu$m. Thereafter, the position of adjustment was shifted to a mid position C, shown in FIG. 4, between the position A and the position B in order to render the adjusting accuracy to fall within 0.5 $\mu$m. The shift to the position C was caused by advancing the synchronizing signal by 127 $\mu$sec.

The irradiation at the position C was carried out at an exciting voltage of 270 V, which was expected to cause a 2.6 $\mu$m height change, as can be known from FIG. 3. As a result of height measurement carried out almost simultaneously with the irradiation, it was confirmed that a height change of 2.3 $\mu$m was caused.

The amount of the head height thus adjusted was 12.0 $\mu$m, which included an adjustment error of only 0.3 $\mu$m with respect to the required amount of adjustment of 12.3 $\mu$m. This proved that highly accurate head adjustment was carried out. After a heat shock test was carried out at temperatures between −40° C.-80° C. for ten hours, no change was confirmed in the amount of deformation, and hence, it was assumed that the head height after the adjustment settled.

In this embodiment, although the head height adjustment was carried out by the voltage control to the laser beam while the position to be irradiated was being changed, the laser beam may be irradiated plural times to the same position. In this case, the number of irradiation is controlled.

Figure 5:
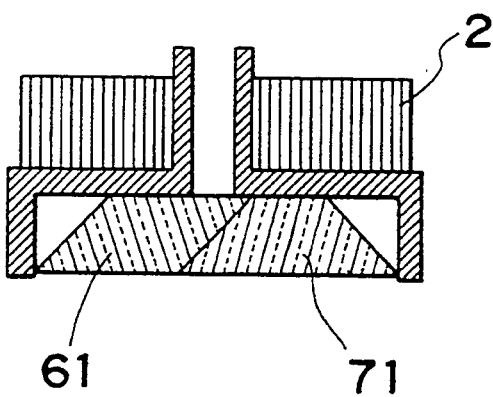
FIG. 5 is a schematic sectional view of a hollow motor accommodating a prism for effecting the method according to the present invention.

Furthermore, although the optical axis was rotated by the hollow motor internally provided with a plurality of mirrors, a prism 61 may be used in place of the mirrors, as shown in FIG. 5. In this case, a balancer 71 is required for adjustment of the weight balance during rotation. Alternatively, the optical axis may be rotated by moving a galvanomirror in synchronism with the cylinder rotation. The galvanomirror is generally known as an instrument suited for use in high-speed laser marking.

In this embodiment, although the Nd-YAG laser was used as the laser beam source, any other suitable light source such as, for example, a $CO_2$ gas laser, an Ar gas laser, or an excimer laser may be used. A head base of a material other than brass may also be used. In this case, the conditions for laser irradiation should be changed.

Moreover, although explanation of the head adjustment was made with respect to the case wherein a single head chip was bonded to the head base, the present invention is applicable to the case wherein a plurality of head chips are bonded to a single head base. The present invention is also applicable to the case wherein a plurality of head bases are secured to a cylinder unit.

In this embodiment, although the welding deformation caused by light energy, i.e. the laser beam irradiation is utilized, any other suitable energy can be used in principle if it is available for local heating. For example, arc welding or electron beam welding utilizing electric energy, ultrasonic welding utilizing ultrasonic energy, gas welding utilizing chemical energy, or the like is available.

As is clear from the above, according to the present invention, the head height adjustment can be carried out under the conditions in which the cylinder unit is being rotated. Because the axis of a laser beam is rotated in synchronism with the cylinder rotation, it is possible to make this axis be always located above a head to be irradiated. It is, therefore, possible to prevent the laser beam from running on a portion to be irradiated and to irradiate the laser beam to any intended spot or point irrespective of the irradiation period of time.

This is advantageous in that the amount of head height adjustment can be enlarged by changing the position to be irradiated, and highly accurate adjustment can be carried out irrespective of the timing accuracy of laser illumination.

Furthermore, because no adjusting vise or minute screw is used, not only the cost required for the head height adjustment can be reduced, but also variations in adjustment, which have hitherto been caused by variations of the contact portion of a pointed end of the screw, or height variations, which have hitherto been caused by vibrations, can be eliminated. Accordingly, highly reliable and highly accurate height adjustment can be realized.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A method of adjusting the height of a magnetic head secured to a head base accommodated in a rotary cylinder, said method comprising the steps of:

rotating an optical axis of a laser beam in synchronism with the rotary cylinder so that the optical axis is always maintained stationary relative to the magnetic head; and irradiating the laser beam to a portion of the head base in the proximity of a head chip secured to the head base, thereby adjusting the head height during rotation of the rotary cylinder.

2. The method according to claim 1, wherein the optical axis of the laser beam passes through the center of a hollow motor.

* * * * *